United States Patent
Hsu

(10) Patent No.: US 10,596,414 B2
(45) Date of Patent: Mar. 24, 2020

(54) SENSING DEVICE FOR TRAINING MACHINE

(71) Applicant: GEE HOO FITEC CORPORATION, New Taipei (TW)

(72) Inventor: Ching-Lu Hsu, Taipei (TW)

(73) Assignee: GEE HOO FITEC CORPORATION, New Taipei (TW)

( * ) Notice: Subject to any disclaimer, the term of this patent is extended or adjusted under 35 U.S.C. 154(b) by 459 days.

(21) Appl. No.: 15/381,114

(22) Filed: Dec. 16, 2016

(65) Prior Publication Data
US 2018/0169469 A1 Jun. 21, 2018

(51) Int. Cl.
*A63B 24/00* (2006.01)
*G01D 5/14* (2006.01)
*A63B 22/06* (2006.01)

(52) U.S. Cl.
CPC ...... *A63B 24/0003* (2013.01); *A63B 22/0664* (2013.01); *G01D 5/145* (2013.01); *A63B 2220/803* (2013.01); *A63B 2220/833* (2013.01)

(58) Field of Classification Search
CPC .................. A63B 22/0664–2022/0688; A63B 24/003–2024/0015
See application file for complete search history.

(56) References Cited

U.S. PATENT DOCUMENTS

| 7,264,576 B2 * | 9/2007 | Gerschefske | A63B 21/023 482/52 |
| 2006/0223679 A1 * | 10/2006 | Gerschefske | A63B 21/023 482/52 |
| 2014/0296034 A1 * | 10/2014 | Wu | A63B 22/0605 482/7 |

* cited by examiner

*Primary Examiner* — Jennifer Robertson
(74) *Attorney, Agent, or Firm* — R. Lynette Wylie; Apex Juris, pllc.

(57) ABSTRACT

A sensing device for a training machine is disclosed. The training machine includes a base frame and two linkage assemblies, which are provided on two lateral sides of the base frame, and are pivotally connected to the base frame. The sensing device includes a sensed member and a sensing unit. The sensed member is engaged with the inside of one of the linkage assemblies, and moves along a movement path along with the linkage assemblies. The sensing unit includes sensors and a processor. Each of the sensors outputs a signal when the sensed member is located in a sensing range thereof. When the sensed member moves along the movement path, it is sequentially sensed by the sensors, and each of the sensors outputs the signal respectively. The processor receives the signals to determine a moving distance of the sensed member accordingly. Whereby, an amount of training could be measured accurately.

5 Claims, 6 Drawing Sheets

SENSING DEVICE FOR TRAINING MACHINE

BACKGROUND OF THE INVENTION

1. Technical Field

The present invention relates to a training machine, and more particularly to a sensing device for measuring a training route.

2. Description of Related Art

Modern people are usually busy and restless, and such lifestyle may cause poor circulation, the problem of inattention, and even illness. With the trend of health consciousness, using a training machine to increase the amount of exercise has become a popular choice, which could enhance the physical ability, increase lung capacity, and maintain the body in a better condition.

The amount of exercise while using a training machine is a basis for determining whether the amount is sufficient to facilitate the metabolism of the body. Therefore, a sensing device would be provided on a training machine to measure the training set and to display the related data for reference.

A training machine adapted to perform a swinging motion is common to have a wheel body indirectly connected to an operable structure. When a user completes a periodic motion, the wheel body makes a complete turn as well. Hence, a sensing device is usually provided on the wheel body, whereby the amount of exercise could be measured by counting the revolution of the wheel body.

However, when the training machine is used by someone with impaired limb function for the purpose of rehabilitation, the wheel body of the training machine may not make a complete turn every time. In such a case, the wheel body would not make a complete revolution, either. As a result, the validity of the measuring of the amount of exercise would be greatly affected. In light of this, if there is a product capable of improving the above problem, it would certainly meet the market requirements.

BRIEF SUMMARY OF THE INVENTION

In view of the above, the primary objective of the present invention is to provide a sensing device for a training machine, which could accurately measure an amount of training.

In order to achieve the above objective, the present invention provides a sensing device for a training machine, wherein the training machine includes a base frame and at least one linkage assembly. The at least one linkage assembly is pivotally connected to the base frame, and is adapted to be pivoted relative to the base frame by a force. The sensing device includes a sensed member and a sensing unit. The sensing device is engaged with the at least one linkage assembly, wherein the sensed member moves along a movement path along with the at least one linkage assembly. The sensing unit includes a plurality of sensors provided on the base frame, wherein each of the sensors outputs a signal when the sensed member is located in a sensing range of each of the sensors. When the sensed member moves along the movement path, the sensed member is sequentially sensed by the sensors, and the sensors correspondingly output the signals respectively.

With the aforementioned design, the amount of training could be measured accurately.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
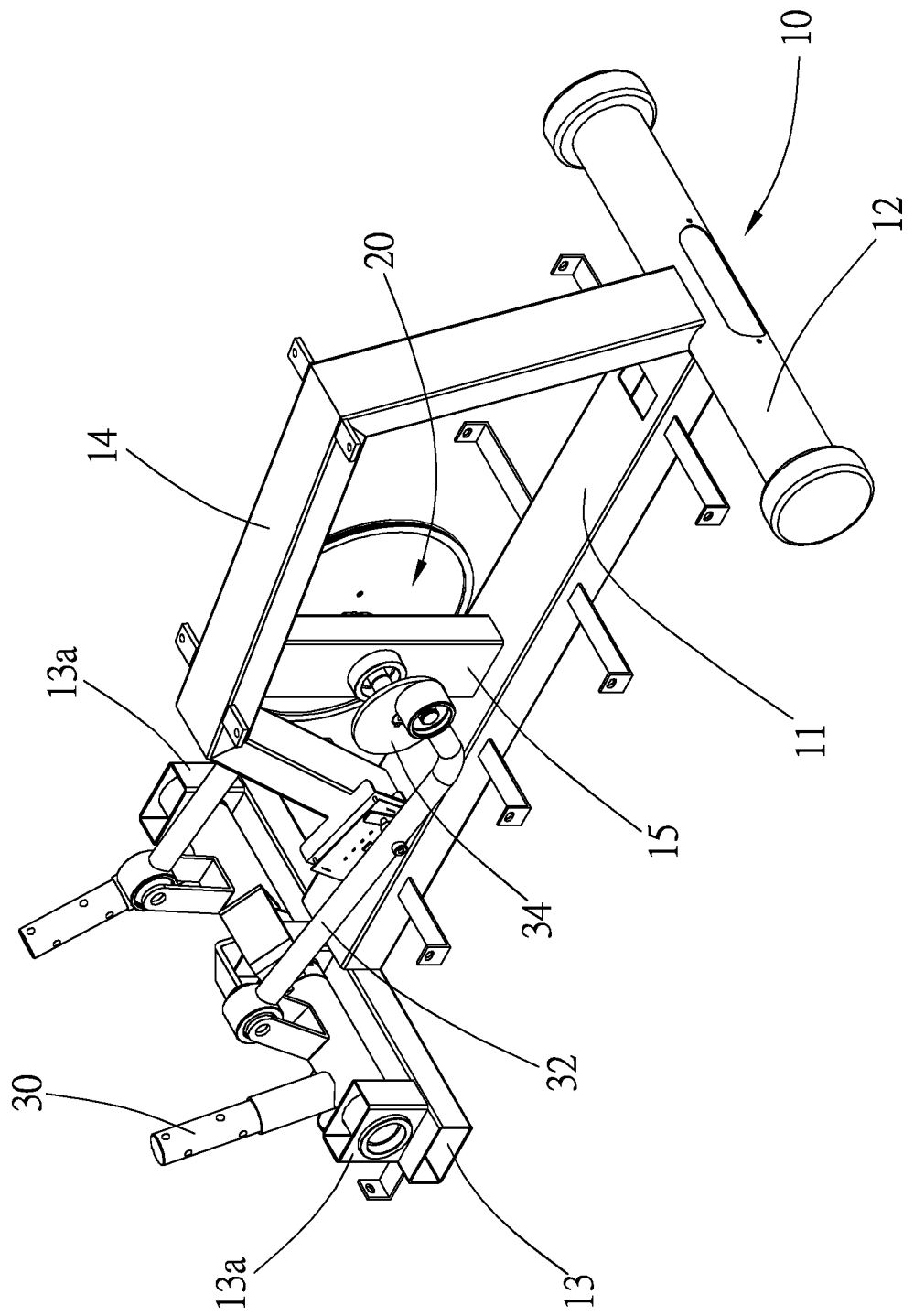
FIG. 1 is a perspective view, showing the sensing device of an embodiment of the present invention provided on the training machine.
Figure 2:
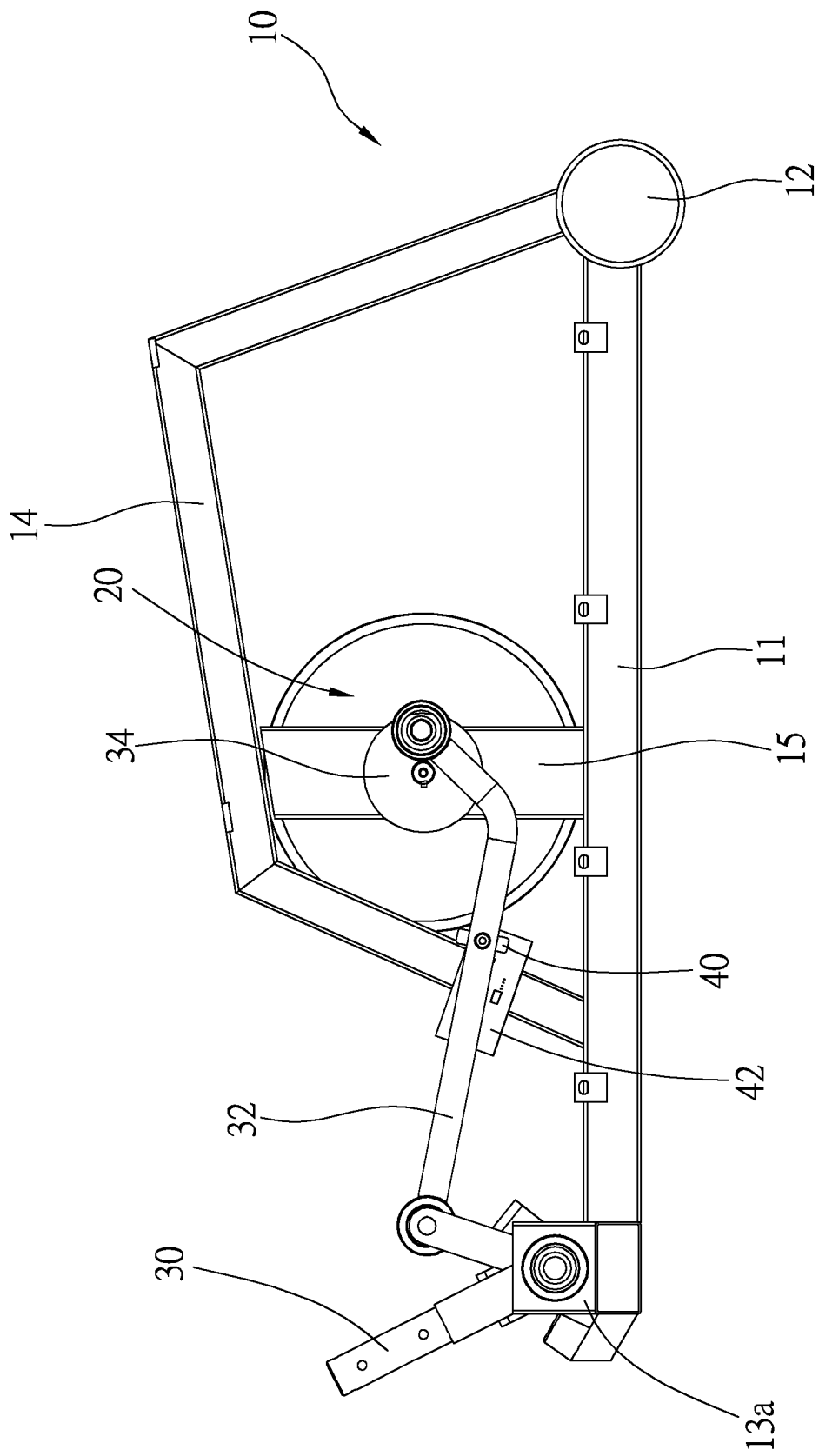
FIG. 2 is a side view of FIG. 1.

A training machine which includes a sensing device of the embodiment of the present invention is illustrated in FIG. 1, wherein the training machine includes a base frame 10 and a wheel body 20.

The base frame 10 includes a bottom bar 11, two cross bars 12, 13, a support 14, and a post 15, wherein the cross bars 12, 13 are respectively connected to two ends of the bottom bar 11. The support 14 is arched, and an end of the support 14 is connected to the bottom bar 11, while another end thereof is connected to one of the cross bars (i.e., the cross bar 12). The post 15 is located between the support 14 and the bottom bar 11, and two ends of the post 15 are respectively connected to the support 14 and the bottom bar 11. Said support 14 is adapted to be provided with a seat (not shown). The wheel body 20 is rotatably provided on the post 15. Two connecting portions 13a are provided on the other one of the cross bars (i.e., the cross bar 13).

The training machine further includes two linkage assemblies provided on two lateral sides of the wheel body 20. Each linkage assembly includes a driving member 30 and a driven member 32, wherein the driven member 32 is a rod. The driving member 30 has a main shaft and two subsidiary portions provided on the main shaft, wherein the two subsidiary portions are respectively provided on the main shaft in different radial directions. The main shaft of the driving member 30 is connected to the corresponding connecting portion 13a. A free end of the driving member 30 is connected to a pedal (not shown), while another free end thereof is pivotally connected to an end of the driven member 32. Another end of the driven member 32 is eccentrically and pivotally connected to a disk 34, wherein the disk 34 is provided on the post, and is coaxial with the wheel body 20. Whereby, the driven member 32 could be rotated along an elliptical movement path along with the rotation of the wheel body 20. With the design above, when the seat is sat on and the pedals are alternately pedaled, the driving member 30 could be pivoted relative to the base frame 10 by a force, and the wheel body 20 would rotate along with the driven member 32. In this way, a specific type of leg exercise could be performed.

Figure 3:
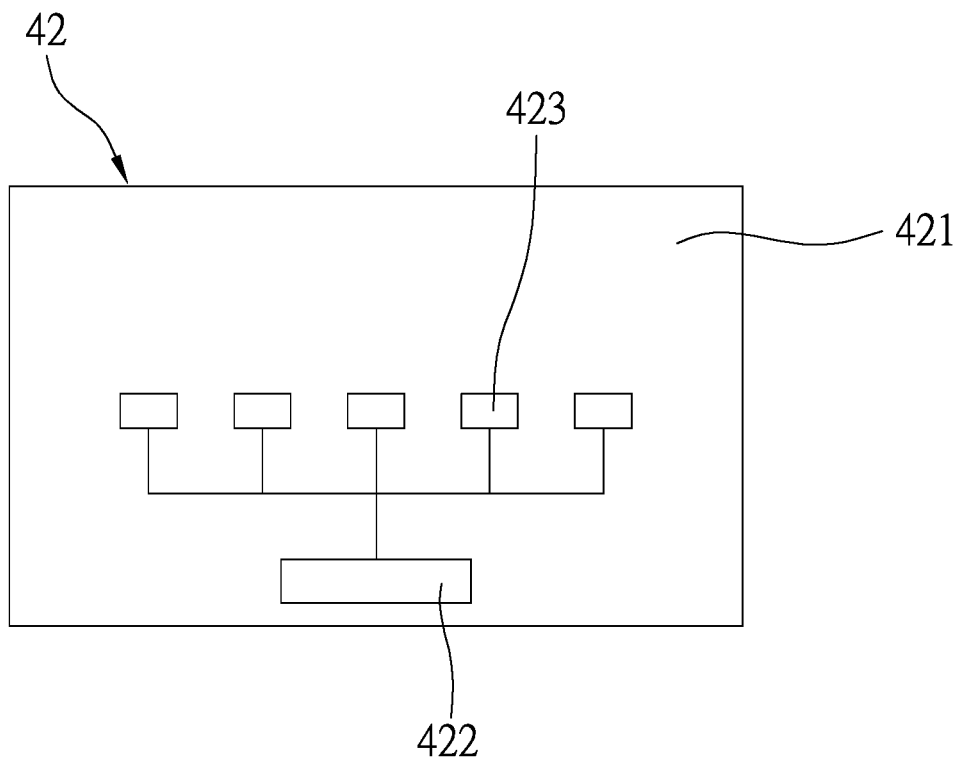
FIG. 3 is a schematic diagram, showing the structures of the sensing unit.

The training machine further includes a sensing device, wherein the sensing device includes a sensed member 40 and a sensing unit 42. The sensed member 40 is engaged with the inside of one of the driven member 32 of the linkage assemblies, and includes a magnet, wherein the sensed member 40 would rotate along an elliptical movement path along with an operation of the training machine. As shown in FIG. 3, the sensing unit 42 includes a circuit board 421, a processor 422, and a plurality of sensors 423, wherein the circuit board 421 is provided on the support 14, and faces the sensed member 40. The processor 422 and the sensors 423 are provided on the circuit board 421 and electrically connected to the circuit board 421. In the embodiment, the sensors 423 are Hall Effect sensors. Furthermore, the sensors 423 are located within an area surrounded by the elliptical movement path of the sensed member 40, and are arranged in a line, wherein the line passes through a major axis of the elliptical movement path of the sensed member 40.

Figure 4:
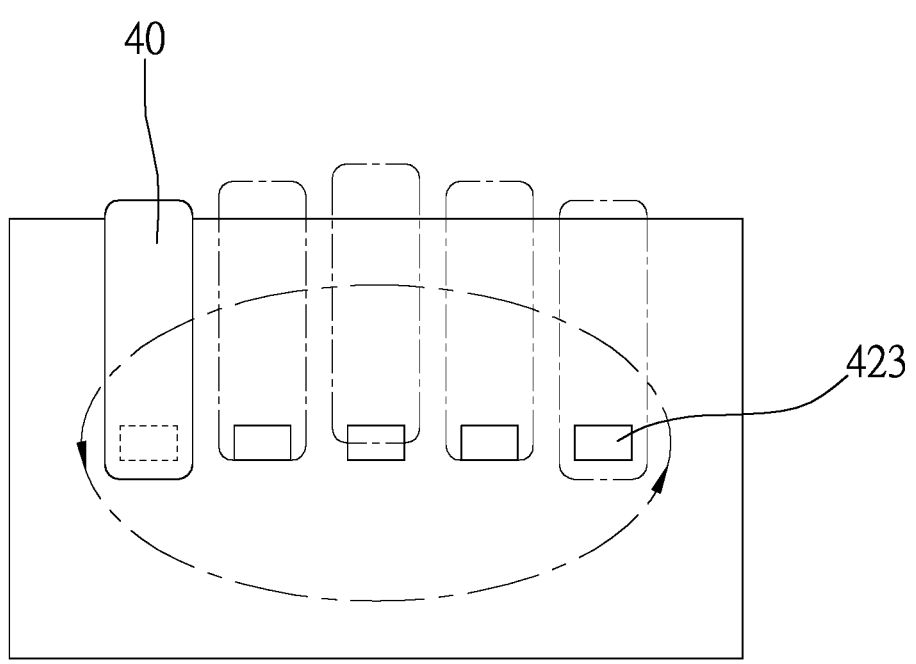
FIG. 4 is a schematic diagram, showing a plurality of sensors are located within an area surrounded by the elliptical movement path of the sensed member, and are arranged in a line.

As shown in FIG. 4, when the seat is sat on and the pedals are alternately pedaled, the wheel body 20 would be rotated smoothly, and the sensed member 40 would rotate along the elliptical movement path. Whereby, the sensors 423 would sequentially sense the sensed member 40 and respectively output a signal to the processor 422. The signals could be processed by the processor 422 to determine an actual moving distance of the sensed member 40, which could be then used as a reference to an amount of training.

Figure 5:
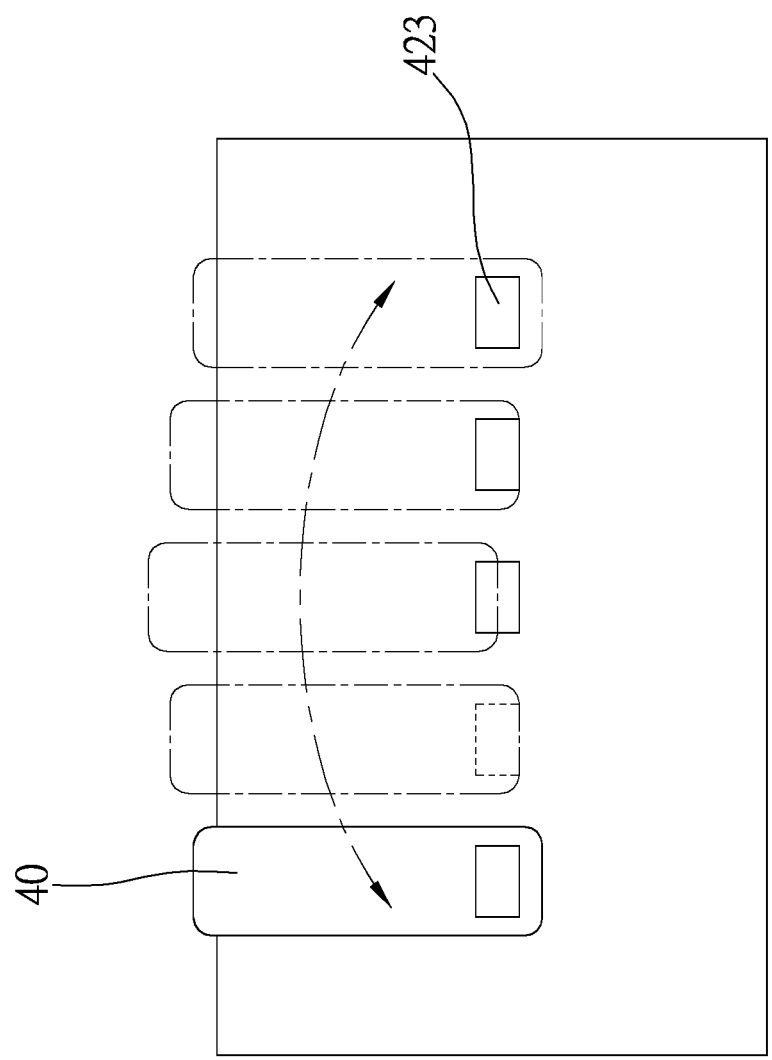
FIG. 5 is a schematic diagram, showing the sensed member moves along a curved path.

As shown in FIG. 5, when the training machine is used by someone with impaired limb function for the purpose of rehabilitation, the seat would also be sat on, and the pedals would be alternately pedaled as well, except that the user may not be able to drive the wheel body 20 normally to make a complete turn every time, subjecting to the physical strength and the limb movements of the user. In such a condition, the sensed member 40 could still move along a curved path along with the operation. Whereby, the sensed member 40 could sequentially pass through a sensing range of each of the sensors, whereby the sensors which successfully senses the sensed member 40 would respectively output the signal to the processor 422. Therefore, the actual movement of the sensed member 40 could be realized by the processor 422.

In other words, no matter whether the wheel body 20 is turned for one complete revolution or not, as long as the sensed member 40 is within the sensing range of any one of the sensors 423, the sensors 423 could output the corresponding signals to the processor 422. In this way, the processor 422 could determine the moving distance of the sensed member 40 accordingly, whereby the actual moving distance could be accurately measured.

It is worth mentioning that, in order to ensure the reliability of the sensors 423, the sensors 423 in the embodiment are not simply arranged in the line, two ends of the line are further positioned on the curved path of the sensed member 40. Whereby, the sensors 423 could be located quite near the curved path, which ensures that the sensed member 40 falls within the sensing range of one of the sensors 423.

Figure 6:
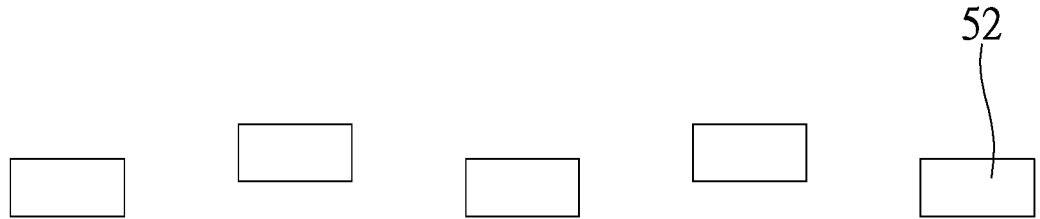
FIG. 6 is a schematic diagram, showing the sensors are arranged in a staggered order.
Figure 7:
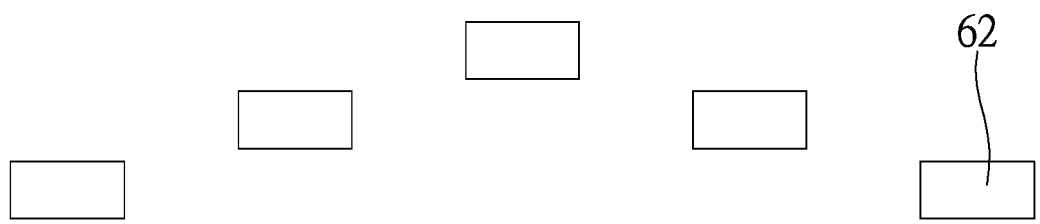
FIG. 7 is a schematic diagram, showing the sensors are arranged along a curved path.
Figure 8:
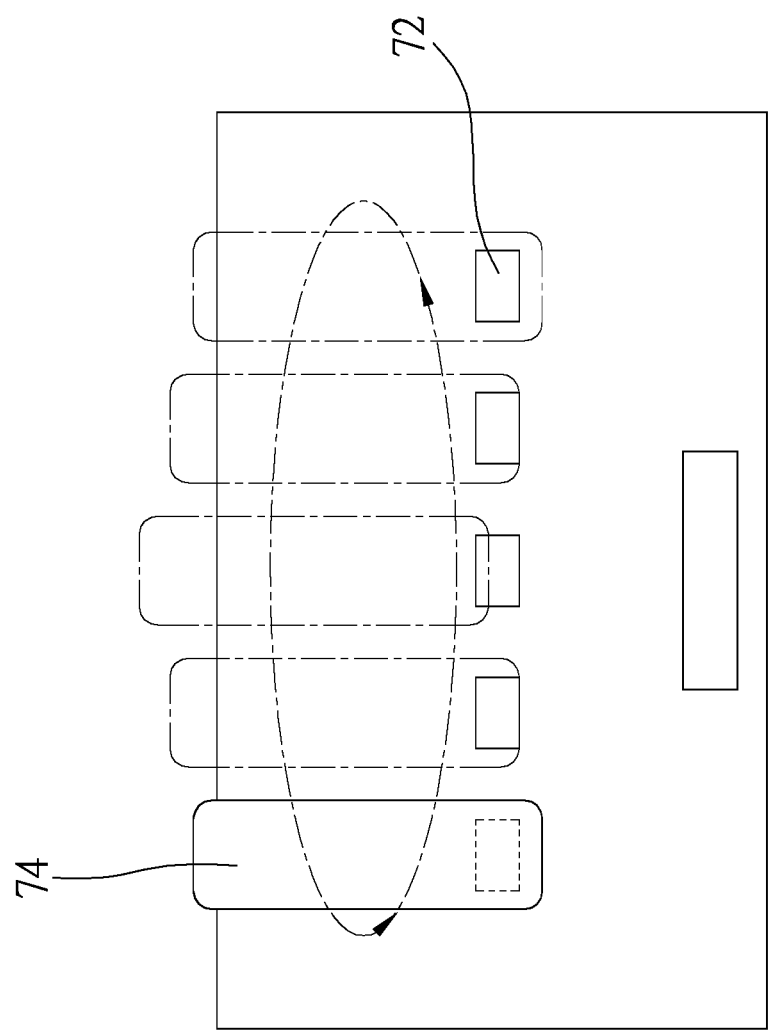
FIG. 8 is a schematic diagram, showing the sensors are arranged in a line, and are located out of an area surrounded by the elliptical movement path of the sensed member.

However, the arrangement of the sensors 423 on the circuit board 421 is not a limitation of the present invention. As shown in FIG. 6, a plurality of sensors 52 in the sensing unit are arranged in a staggered order and located within the area surrounded by the elliptical movement path of the sensed member 40. Also, as shown in FIG. 7, a plurality of sensors 62 are arranged along a curved path and, again, located within the area surrounded by the elliptical movement path. As shown in FIG. 8, a plurality of sensors 72 are arranged in a line, which is similar to the arrangement shown in FIG. 3, yet the sensors 72 are located outside of the area surrounded by the elliptical movement path of a sensed member 74. A width and a length of the sensed member 40, 74 could be appropriately modified to ensure the sensors 423, 52, 62, 72 able to perform their function.

It must be pointed out that the embodiments described above are only some preferred embodiments of the present invention. All equivalent structures which employ the concepts disclosed in this specification and the appended claims should fall within the scope of the present invention.

What is claimed is:

1. A sensing device for a training machine, wherein the training machine comprises a base frame, a wheel body, and at least one linkage assembly; the at least one linkage assembly is pivotally connected to the base frame, and is adapted to be pivoted relative to the base frame by a force; the sensing device comprising:

a sensed member, which is engaged with the at least one linkage assembly, wherein the sensed member moves along a movement path along with the at least one linkage assembly; and a sensing unit, which comprises a plurality of sensors provided on the base frame, wherein each of the sensors outputs a signal when the sensed member is located in a sensing range of each of the sensors; when the sensed member moves along the movement path, the sensed member is sequentially sensed by the sensors, and the sensors correspondingly output the signals respectively;

wherein the at least one linkage assembly includes a driving member at an end of the at least one linkage assembly pivotally connected to the base frame, and another end of the at least one linkage assembly is eccentrically and pivotally connected to a disk which is coaxial with the wheel body and moves in a circular path, so that the movement path is elliptical, and the sensors are located in an area parallel to an area surrounded by the elliptical movement path.

2. The sensing device of claim 1, wherein the sensing unit further comprises a circuit board and a processor; the circuit board is engaged with the base frame; the sensors are provided on the circuit board; the processor is adapted to sense the signals outputted by the sensors, and determine a moving distance of the sensors according to the signals.

3. The sensing device of claim 1, wherein the sensors are arranged in a line, and the line of the sensors is parallel with the major axis of the elliptical movement path.

4. The sensing device of claim 1, wherein the sensed member further comprises a magnet, and each of the sensors is a Hall Effect sensor.

5. The sensing device of claim 1, wherein the sensors are located outside of an area surrounded by the elliptical movement path.

* * * * *